United States Patent
Salter

(10) Patent No.: US 12,219,090 B2
(45) Date of Patent: *Feb. 4, 2025

(54) DYNAMIC MESSAGE PROCESSING AND AGGREGATION OF DATA IN MESSAGING

(71) Applicant: LIVEPERSON, INC., New York, NY (US)

(72) Inventor: Jeffrey Salter, Marietta, GA (US)

(73) Assignee: LIVEPERSON, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,071

(22) Filed: Dec. 13, 2022

(65) Prior Publication Data

US 2023/0328177 A1    Oct. 12, 2023

Related U.S. Application Data

(63) Continuation of application No. 17/143,287, filed on Jan. 7, 2021, now Pat. No. 11,558,503, which is a continuation of application No. 16/830,849, filed on Mar. 26, 2020, now Pat. No. 10,917,518.

(60) Provisional application No. 62/825,153, filed on Mar. 28, 2019.

(51) Int. Cl.
*H04M 3/42*     (2006.01)
*G06F 40/30*    (2020.01)
*G06N 20/00*    (2019.01)
*H04M 3/493*    (2006.01)
*H04M 3/523*    (2006.01)
*H04W 4/14*     (2009.01)

(52) U.S. Cl.
CPC ........ *H04M 3/42382* (2013.01); *G06F 40/30* (2020.01); *G06N 20/00* (2019.01); *H04M 3/4936* (2013.01); *H04M 3/5232* (2013.01); *H04W 4/14* (2013.01)

(58) Field of Classification Search
CPC ........... H04M 3/42382; H04M 3/4936; H04M 3/5232; H04M 3/523; H04M 7/0048; H04M 2203/651; H04M 3/5141; G06F 40/30; G06N 20/00; H04W 4/14; H04L 51/066
See application file for complete search history.

(56) References Cited

U.S. PATENT DOCUMENTS

| | | | |
|---|---|---|---|
| 2007/0064912 A1* | 3/2007 | Kagan | H04M 3/5232 379/265.1 |
| 2014/0280292 A1* | 9/2014 | Skinder | G06F 16/24534 707/767 |
| 2019/0012390 A1* | 1/2019 | Nishant | G06N 3/006 |
| 2019/0349720 A1* | 11/2019 | Arzumanyan | H04L 51/56 |
| 2020/0007493 A1* | 1/2020 | Nair | G06F 40/30 |
| 2020/0380963 A1* | 12/2020 | Chappidi | G10L 15/063 |

* cited by examiner

*Primary Examiner* — Austin J Moreau
(74) *Attorney, Agent, or Firm* — POLSINELLI LLP

(57) ABSTRACT

A network device (e.g., a user's mobile phone) may be used to make a telephone call to a landline telephone associated with a client device (e.g., a business's device). If the telephone call is terminated, either the network device or the client device may generate a text message to the other and establish a communication session. The client device may present a variety of options to the network device of service requests that may be completed by text message. The network device may transmit the service request and the service request may be fulfilled by the client.

21 Claims, 9 Drawing Sheets

DYNAMIC MESSAGE PROCESSING AND AGGREGATION OF DATA IN MESSAGING

CROSS-REFERENCES TO RELATED APPLICATIONS

This application is a continuation of U.S. patent application Ser. No. 17/143,287 filed Jan. 7, 2021, which is a continuation of U.S. patent application Ser. No. 16/830,849, filed Mar. 26, 2020, which claims the benefit of U.S. Provisional Application No. 62/825,153, filed Mar. 28, 2019, all of which are incorporated herein by reference in their entirety for all purposes.

FIELD

The present disclosure relates generally to facilitating routing of communications. More specifically, techniques are provided to dynamically route and process messages between disparate devices during communication sessions. For example, embodiments can redirect a caller from a telephony environment to a text messaging environment in order to perform services with one or more clients.

BACKGROUND

Clients often use telephony systems to field phone calls from users seeking their services. These telephony systems may allow users to speak with a live representative of the client, or may use an interactive voice response (IVR) system. IVR is a technology that allows a human caller to call and communicate with a computer in a telephony environment. In an IVR telephony environment, the computer typically outputs prerecorded voice audio prompts that the human caller typically answers using dual-tone multi-frequency signaling (DTMF) tones as input via a keypad of the human caller's phone. IVR telephony systems are often used to determine why a human caller is calling so that the human caller can be directed to a human operator that might be able to assist the human caller. However, callers often complain that traditional IVR systems can often waste time by forcing the caller to listen to a lengthy recording reading every option of an extensive menu before the caller can make a selection. Callers can also often be placed on hold for long periods of time waiting to speak to a human operator, or the human operator may not answer the phone at all, leading to frustration.

SMS (short message service) is a text messaging service enabling text-based communication between two mobile phone devices using standardized communication protocols. MMS (multimedia message service) is a messaging service enabling communication between two mobile phone devices that can send images as well as text using standardized communication protocols. Messaging services are convenient for users in that they enable asynchronous communication, alerting users when a message comes in without the users having to pay constant attention as they would during a traditional audio-based telephone call.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure provide technical solutions to address the technical challenges presented above. For example, a network device (e.g., a user's mobile phone) may be used to make a telephone call to a landline telephone associated with a client device (e.g., a business's device). If the telephone call is terminated, either the network device or the client device may generate a text message to the other and establish a communication session. The client device may present a variety of options to the network device of service requests that may be completed by text message. The network device may transmit the service request and the service request may be fulfilled by the client. At some point thereafter, the client device may terminate the communication session and hand off the conversation to a server (e.g., an aggregator associated with a plurality of client devices, and/or a plurality of terminal devices and agents). The server may accept queries and natural language communications from the network device and answer the queries as appropriate. Unlike the client device, queries made to the server do not have to be client-specific, and may relate to a plurality of clients or any other subject unrelated to the client.

Certain embodiments of the present disclosure include a computer-implemented method. The method may include receiving a message from a network device at a client device. The message may include a plurality of routing paths. The method may include generating a selection of a routing path of the plurality of routing paths. The method may include establishing a two-way communication session between the client device and a node of the network device. The node may be determined based on the selected routing path. The method may include facilitating termination of the two-way communication session. Termination may cause the network device to transmit the selected routing path. The method may include receiving data related to the selected routing path. The method may include transmitting a new message. The new message may include an intent indicator data. When the new message is received at a server, the server may generate a response by using a machine-learning model to evaluating the selected routing path and the intent indicator data. The method may include receiving the response to the new message. The response may include one or more suggestions that correspond to the selected routing path and the intent indicator data. The method may include facilitating display of the response.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples of embodiment(s) only and is not intended to limit the scope, applicability or configuration of the disclosure. Rather, the ensuing description of the examples of embodiment(s) will provide those skilled in the art with an enabling description for implementing examples of embodiment. It is understood that various changes can be made in the function and arrangement of elements without departing from the spirit and scope as set forth in the appended claims.

Figure 1:
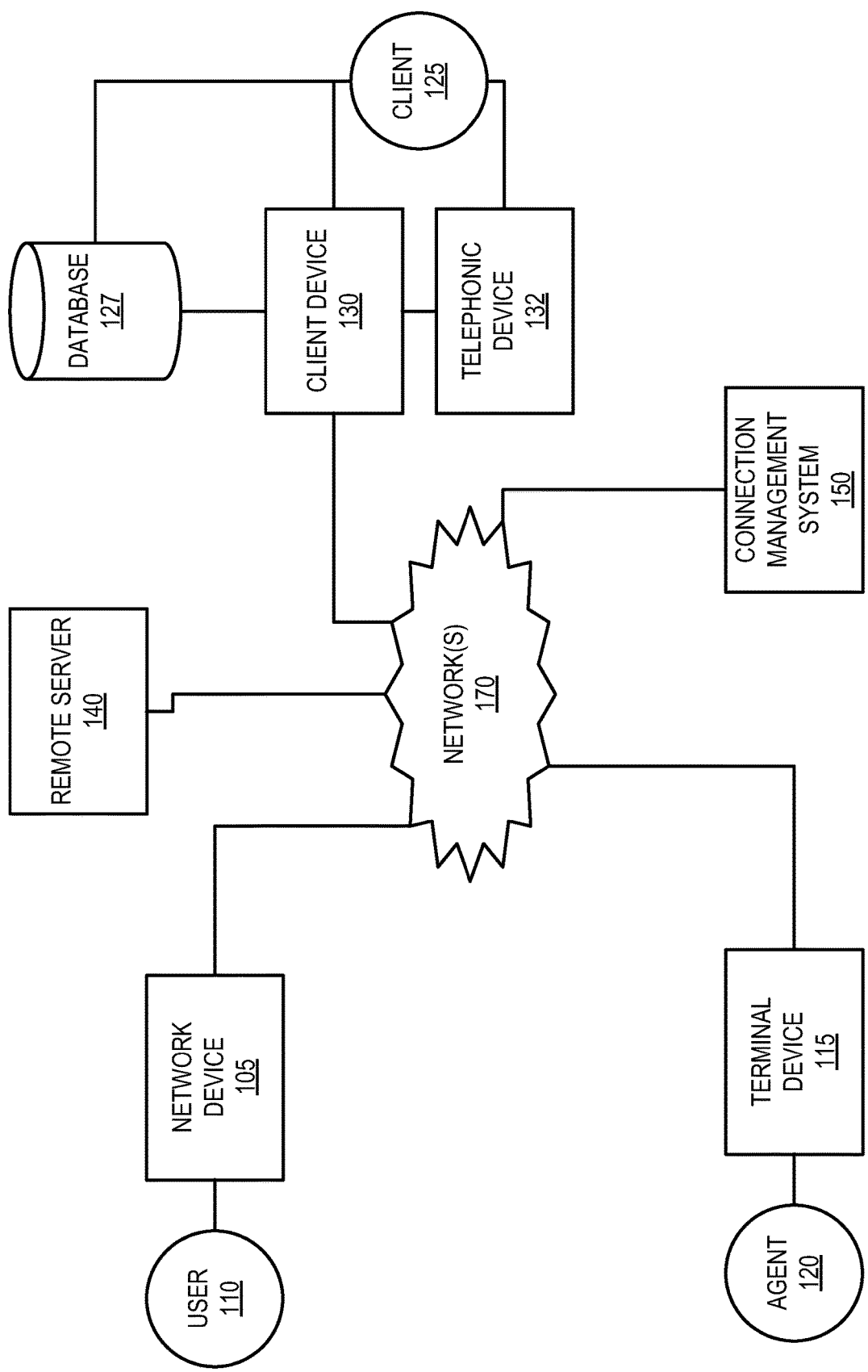
FIG. 1 shows a block diagram of an embodiment of a network interaction system.

FIG. 1 shows a block diagram of an embodiment of a network interaction system which implements and supports certain embodiments and features described herein. Certain embodiments relate to establishing a connection channel between a network device 105 (which can be operated by a user 110) and a client device 130 associated with a client 125. In certain embodiments, the network interaction system can include a terminal device 115 (which can be operated by an agent 120).

In certain embodiments, a user 110 can be an individual attempting to contact a client 125 via telephonic device 132. A client 125 can be an entity that provides, operates, or runs a service, or individuals employed by or assigned by such an entity to perform the tasks available to a client 125 as described herein. The agent 120 can be an individual, such as a support agent tasked with providing support or information to the user 110 regarding the service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual attempting to book an appointment via a cell phone, a client 125 can be a company that provides medical services, and an agent 120 can be a representative employed by the company. In various embodiments, the user 110, client 125, and agent 120 can be other individuals or entities.

While FIG. 1 shows only a single network device 105, terminal device 115 and client device 130 coupled to a database 127, an interaction system can include multiple or many (e.g., tens, hundreds or thousands) of each of one or more of these types of devices. In various implementations, different nodes of an interaction system can include repeated copies of client device 130, telephonic device 132, and other devices coupled to one or more shared database(s) 127 for client 125. Similarly, while FIG. 1 shows only a single user 110, agent 120 and client 125, an interaction system of FIG. 1 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality being associated with a terminal device (e.g., terminal device 115). The evaluation can relate to a content in a network-device message.

In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular item (e.g., product), connection management system 150 can automatically transmit an additional message to terminal device 115 containing additional information about the item (e.g., quantity of item available, links to support documents related to the item, or other information about the item or similar items).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
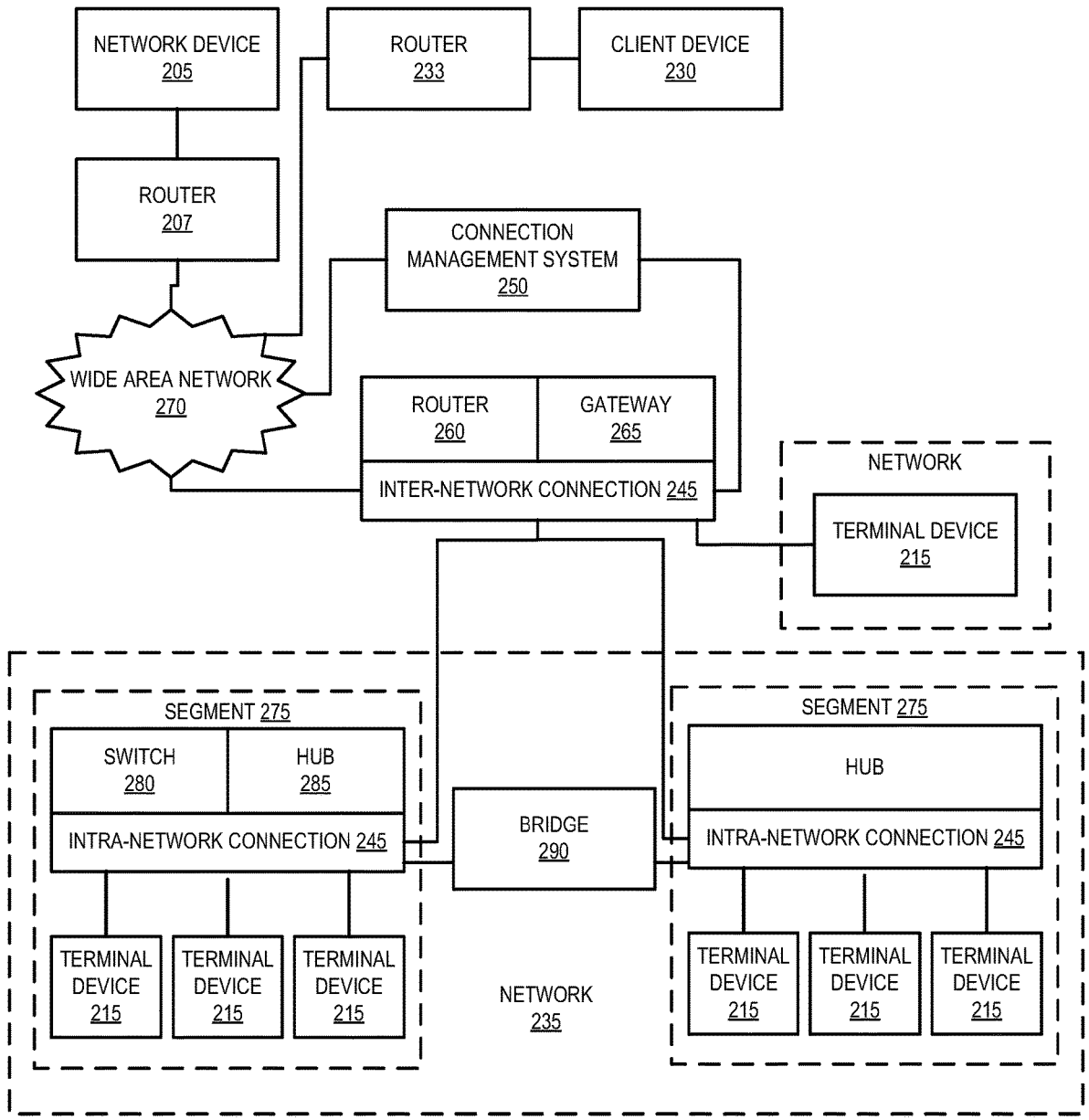
FIG. 2 shows a block diagram of an embodiment of a network interaction system that includes a connection management system.

FIG. 2 shows a block diagram of another embodiment of a network interaction system. Generally, FIG. 2 illustrates a variety of components configured and arranged to enable a network device 205 to communicate with one or more terminal devices 215 via network connections such as router 207 and wide area network 270. The depicted instance includes nine terminal devices 215 included in three local-area networks 235.

In some instances, a communication from network device 205 includes destination data (e.g., a destination IP address) that at least partly or entirely indicates which terminal device is to receive the communication. A network interaction system such as the system described in FIG. 2 can include one or more inter-network connection components 245 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication is handled by multiple inter-network connection components 245. Similarly, communications with client device 230 via router 233 are also handled by inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still be performed. Such intra-network routing can be performed via an intra-network connection component 245, such as a switch 280 or hub 285. Each intra-network connection component 245 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 245 can be provided in each of one, more or all segments to facilitate intra-segment routing. A bridge 290 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

In FIG. 2, connection management system 250 can be configured to serve as a relay and/or destination address. Thus, for example, a set of network devices 205 may transmit communications, each identifying connection management system 250 as a destination. Connection management system 250 can receive each communication and can concurrently monitor a set of terminal devices (e.g., so as to generate metrics for each terminal device). Based on the monitoring and a rule, connection management system 250 can identify a terminal device 215 to which it may relay each communication. Depending on the embodiment, terminal device communications may similarly be directed to a consistent destination (e.g., of connection management system 250) for further relaying, or terminal devices may begin communicating directly with corresponding network devices. These embodiments can facilitate efficient routing and thorough communication monitoring.

It will be appreciated that many variations of FIG. 2 are contemplated. For example, connection management system 250 may be associated with a connection component (e.g., inter-network connection component 245 or intra-network connection component 245) such that an application corresponding to connection management system 250 (or part thereof) is installed on the component. The application may, for example, perform independently or by communicating with one or more similar or complementary applications (e.g., executing on one or more other components, network devices or remotes servers).

Figure 3:
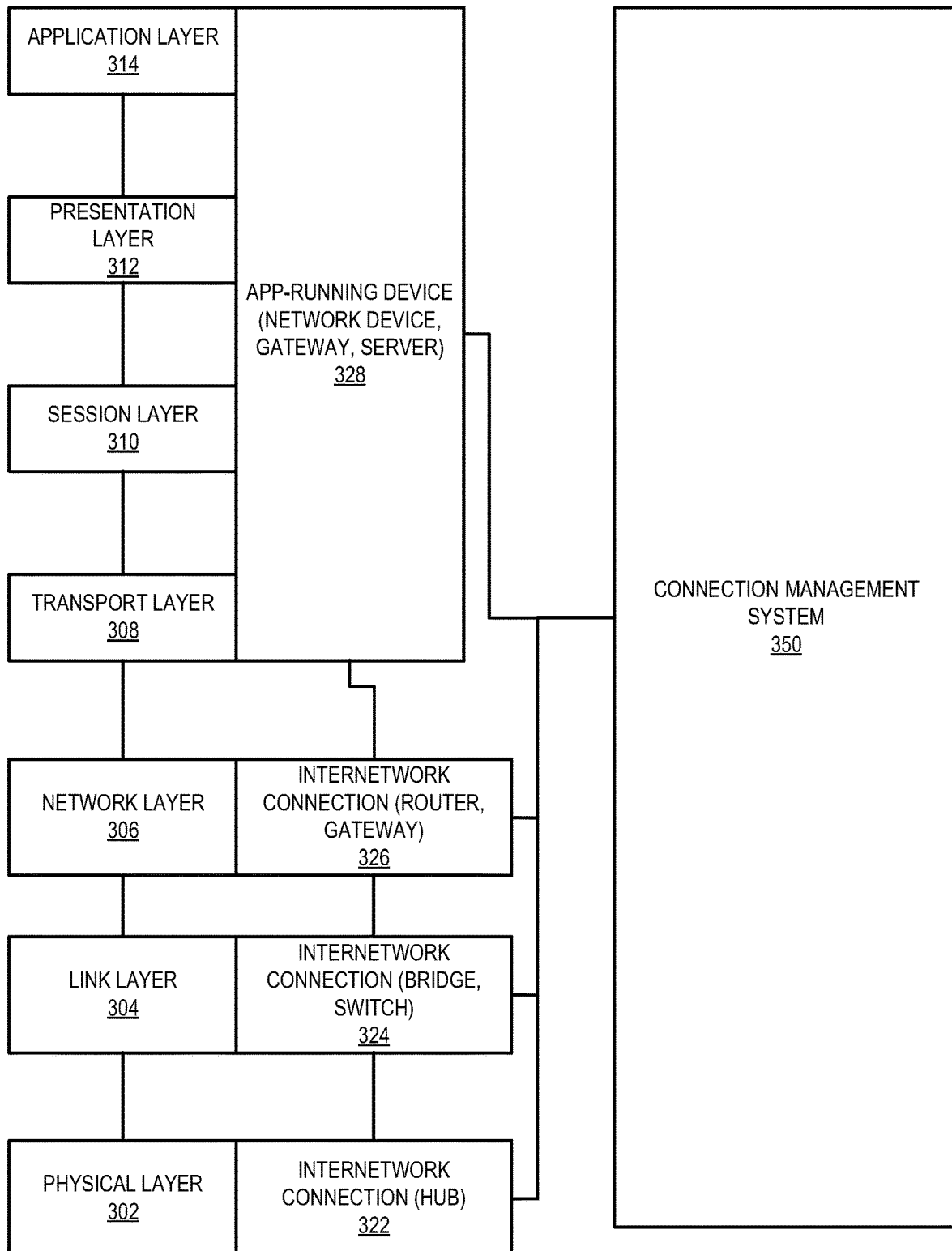
FIG. 3 shows a representation of a protocol-stack mapping of connection components' operation.

FIG. 3 shows a representation of a protocol-stack mapping of connection components' operation. More specifically, FIG. 3 identifies a layer of operation in an Open Systems Interaction (OSI) model that corresponds to various connection components.

The OSI model can include multiple logical layers 302-314. The layers are arranged in an ordered stack, such that layers 302-312 each serve a higher level and layers 304-314 is each served by a lower layer. The OSI model includes a physical layer 302. Physical layer 302 can define parameters physical communication (e.g., electrical, optical, or electromagnetic). Physical layer 302 also defines connection management protocols, such as protocols to establish and close connections. Physical layer 302 can further define a flow-control protocol and a transmission mode.

A link layer 304 can manage node-to-node communications. Link layer 304 can detect and correct errors (e.g., transmission errors in the physical layer 302) and manage access permissions. Link layer 304 can include a media access control (MAC) layer and logical link control (LLC) layer.

A network layer 306 can coordinate transferring data (e.g., of variable length) across nodes in a same network (e.g., as datagrams). Network layer 306 can convert a logical network address to a physical machine address.

A transport layer 308 can manage transmission and receipt quality. Transport layer 308 can provide a protocol for transferring data, such as a Transmission Control Protocol (TCP). Transport layer 308 can perform segmentation/desegmentation of data packets for transmission and can detect and account for transmission errors occurring in layers 302-306. A session layer 310 can initiate, maintain and terminate connections between local and remote applications. Sessions may be used as part of remote-procedure interactions. A presentation layer 312 can encrypt, decrypt and format data based on data types known to be accepted by an application or network layer.

An application layer 314 can interact with software applications that control or manage communications. Via such applications, application layer 314 can (for example) identify destinations, local resource states or availability and/or communication content or formatting. Various layers 302-314 can perform other functions as available and applicable.

Intra-network connection components 322, 324 are shown to operate in physical layer 302 and link layer 304. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in a link layer, as they are capable of filtering communication frames based on addresses (e.g., MAC addresses).

Meanwhile, inter-network connection components 326, 328 are shown to operate on higher levels (e.g., layers 306-314). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 350 can interact with and/or operate on, in various embodiments, one, more, all or any of the various layers. For example, connection management system 350 can interact with a hub so as to dynamically adjust which terminal devices or client devices the hub communicates. As another example, connection management system 350 can communicate with a bridge, switch, router or gateway so as to influence which terminal device the component selects as a destination (e.g., MAC, logical or physical) address. By way of further examples, a connection management system 350 can monitor, control, or direct segmentation of data packets on transport layer 308, session duration on session layer 310, and/or encryption and/or compression on presentation layer 312. In some embodiments, connection management system 350 can interact with various layers by exchanging communications with (e.g., sending commands to) equipment operating on a particular layer (e.g., a switch operating on link layer 304), by routing or modifying existing communications (e.g., between a network device and a client device) in a particular manner, and/or by generating new communications containing particular information (e.g., new destination addresses) based on the existing communication. Thus, connection management system 350 can influence communication routing and channel establishment (or maintenance or termination) via interaction with a variety of devices and/or via influencing operating at a variety of protocol-stack layers.

Figure 4:
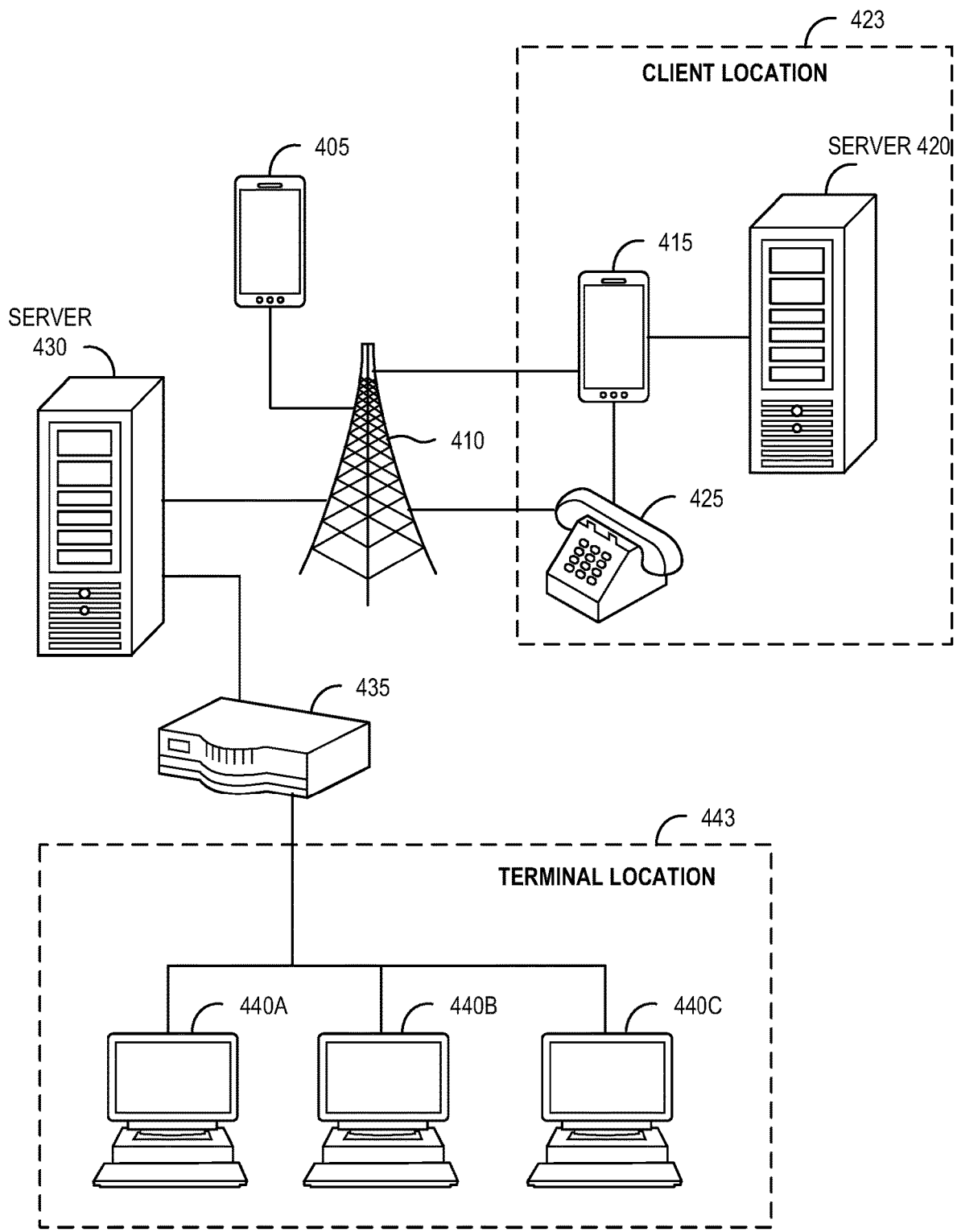
FIG. 4 represents a multi-device communication exchange system according to an embodiment.

FIG. 4 represents a multi-device communication exchange system according to an embodiment. The system includes a network device 405 configured to communicate with a variety of types of terminal devices and client devices over a variety of types of communication channels.

In the depicted instance, network device 405 can transmit a telephonic or text message communication over a cellular network (e.g., via a base station 410). The communication can be routed to a client location 423 or a terminal location 443. A connection management system 430 receives the communication and identifies which client device or terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 4, each cluster of terminal devices 440A, 440B, and 440C can correspond to a different client or to different nodes for a particular client (e.g. nodes focused on different topics, response types, or associated with a particular routing path or parts of a routing path). The terminal devices may be geographically co-located or disperse. The metrics may be determined based on stored or learned data and/or real-time monitoring (e.g., based on availability).

Connection management system 430 can communicate with various terminal devices and client devices and other components via one or more routers 435 or other inter-network or intra-network connection components. Connection management system 430 may collect, analyze and/or store data from or pertaining to communications, terminal-device operations, client rules, and/or user-associated actions (e.g., online activity) at one or more data stores. Such data may influence communication routing.

For example, machine learning models can use previous data and results of routing from prior operations to improve selection of future routing. This can be done with any combination of supervised learning with constructed data sets and historical data, unsupervised learning based on expectation or projection models for current routing paths in a system and system use targets, Any such data can be used in operations for natural language processing (e.g. natural language understanding, natural language inference, etc.) to generate natural language data or to update machine learning models. Such data can then be used by the client systems or shared with applications running on a network device or on a server to improve dynamic message processing (e.g. improved intent indicator data results or response message generation).

Client device 415 may also be connected to a telephonic device 425 associated with a client location. The telephonic device 425 may be a landline phone associated with a telephone number in some embodiments. Network device 405 may have the capability to generate and transmit a text (e.g., SMS) message to the telephone number associated with the telephonic device 425, which may be routed to the client device 415 in some embodiments. The client device 415 may be capable of receiving and processing text messages. In order to process received text messages from network device 405, client device 415 may be coupled to a server 420. Server 420 may receive and respond to inquiries from client device 415 for information regarding the goods or services provided at the client location 423, such as product information, an appointment schedule, hours of operation, location information, contact information, and the like.

Figure 5:
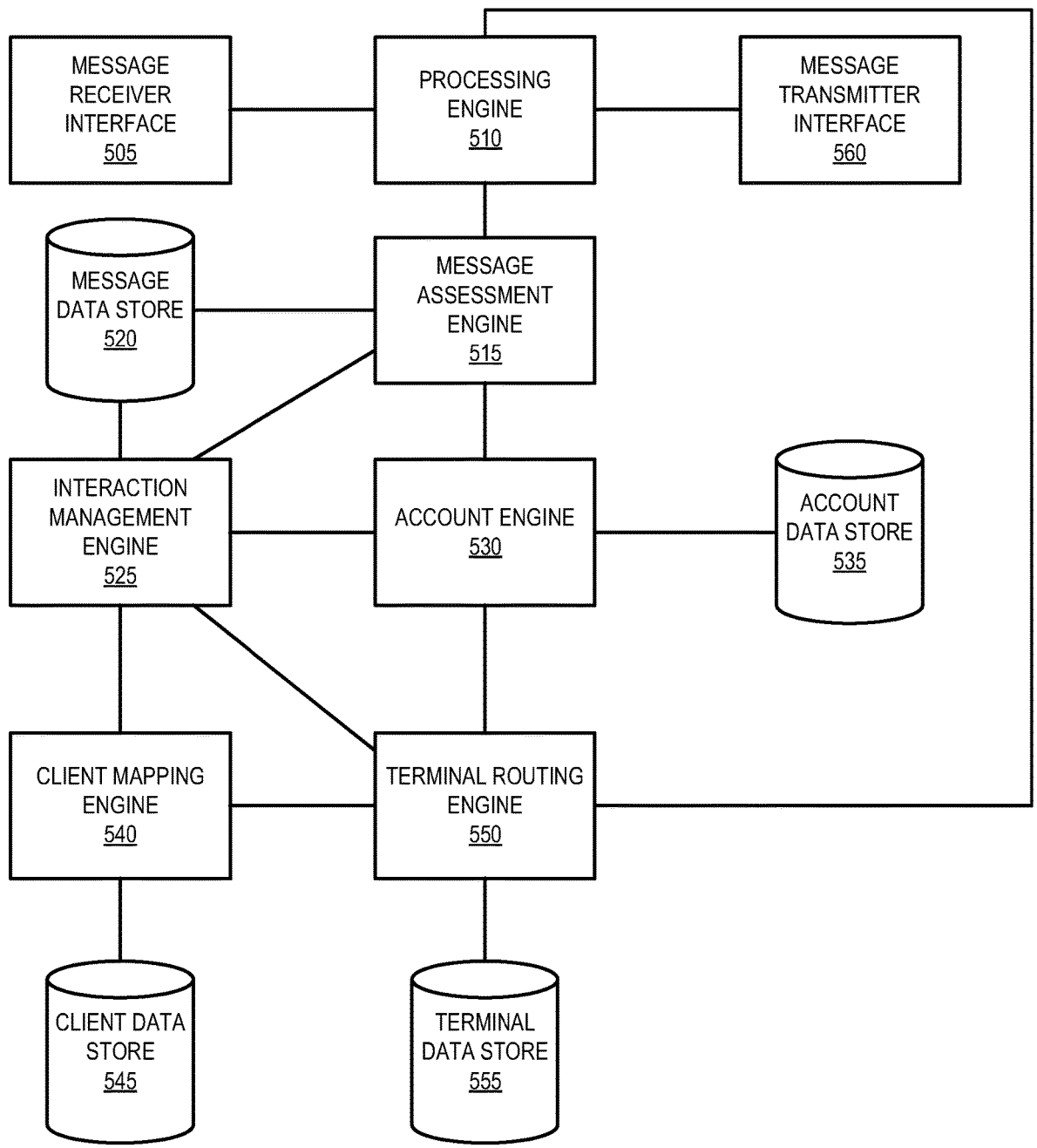
FIG. 5 shows a block diagram of an embodiment of a connection management system.

FIG. 5 shows a block diagram of an embodiment of a connection management system. A message receiver interface 505 can receive a message. In some instances, the message can be received, for example, as part of a communication transmitted by a source device (e.g., housed separately from connection management system or within a same housing), such as a network device. In some instances, the communication can be part of a series of communications or a communicate exchange, which can include a series of messages or message exchange being routed between two devices (e.g., a network device and a client device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client. To illustrate, a network device may be presenting an app page of a particular client, which may offer an option to transmit a communication to an agent. Upon receiving user input corresponding to a message, a communication may be generated to include the message and an identifier of the particular client (e.g., a text message to a phone number).

A processing engine 510 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 515 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a technical issue, a use question, or a request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 515 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 515 can store a message, message metric and/or message statistic in a message data store 520. Each message can also be stored in association with other data (e.g., metadata), such as data identifying a corresponding source device, destination device, network device, terminal device, client, one or more categories, one or more stages and/or message-associated statistics). Various components of the connection management system (e.g., message assessment engine 515 and/or an interaction management engine 525) can query message data store 520 to retrieve query-responsive messages, message metrics and/or message statistics.

An interaction management engine 525 can determine to which device a communication is to be routed and how the receiving and transmitting devices are to communicate. Each of these determinations can depend, for example, on whether a particular network device (or any network device associated with a particular user) has previously communicated with a client device or terminal device in a set of terminal devices (e.g., any terminal device associated with the connection management system or any terminal device associated with one or more particular clients).

In some instances, when a network device (or other network device associated with a same user or profile) has previously communicated with a given terminal device, communication routing can be generally biased towards the same terminal device. Other factors that may influence routing can include, for example, whether the terminal device (or corresponding agent) is available and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device, a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client). In one instance, a rule can identify how to determine a sub-parameter to one or more factors such as these and a weight to assign to each parameter. By combining (e.g., summing) weighted sub-parameters, a parameter for each agent can be determined. A terminal device selection can then be made by comparing terminal devices' parameters.

With regard to determining how devices are to communicate, interaction management engine 525 can (for example) determine whether a client device or terminal device is to respond to a communication via (for example) SMS message, voice call, video communication, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 525 can determine whether a continuous channel between two devices should be established, used or terminated. A continuous channel can be structured so as to facilitate routing of future communications from a network device to a specified terminal device or client device. This bias can persist even across message series. In some instances, a representation of a continuous channel (e.g., identifying an agent) can be included in a presentation to be presented on a network device. In this manner, a user can understand that communications are to be consistently routed so as to promote efficiency.

In one instance, a parameter can be generated using one or more factors described herein and a rule (e.g., that includes a weight for each of the one or more factors) to determine a connection parameter corresponding to a given network device and terminal device. The parameter may pertain to an overall match or one specific to a given communication or communication series. Thus, for example, the parameter may reflect a degree to which a given terminal device is predicted to be suited to respond to a network-device communication. In some instances, a parameter analysis can be used to identify each of a terminal device to route a given communication to and whether to establish, use or terminate a connection channel. When a parameter analysis is used to both address a routing decision and a channel decision, a parameter relevant to each decision may be determined in a same, similar or different manner.

Thus, for example, it will be appreciated that different factors may be considered depending on whether the parameter is to predict a strength of a long-term match versus one to respond to a particular message query. For example, in the former instance, considerations of overall schedules and time zones may be important, while in the latter instance, immediate availability may be more highly weighted. A parameter can be determined for a single network-device/terminal-device combination, or multiple parameters can be determined, each characterizing a match between a given network device and a different terminal device.

To illustrate, a set of three terminal devices associated with a client may be evaluated for potential communication routing. A parameter may be generated for each that relates to a match for the particular communication. Each of the first two terminal devices may have previously communicated with a network device having transmitted the communication. An input from the network device may have indicated positive feedback associated with an interaction with the communication(s) with the first device. Thus, a past-interact sub-parameter (as calculated according to a rule) for the first, second and third devices may be 10, 5, and 0, respectively. (Negative feedback inputs may result in negative sub-parameters.) It may be determined that only the third terminal device is available. It may be predicted that the second terminal device will be available for responding within 15 minutes, but that the first terminal device will not be available for responding until the next day. Thus, a fast-response sub-parameter for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-parameters of 3, 4 and 9. In this example, the rule does not include weighting or normalization parameters (though, in other instances, a rule may), resulting in parameters of 14, 11 and 19. Thus, the rule may indicate that the message is to be routed to a device with the highest parameter, that being the third terminal device. If routing to a particular terminal device is unsuccessful, the message can be routed to a device with the next-highest parameter, and so on.

A parameter may be compared to one or more absolute or relative thresholds. For example, parameters for a set of terminal devices can be compared to each other to identify a high parameter to select a terminal device to which a communication can be routed. As another example, a parameter (e.g., a high parameter) can be compared to one or more absolute thresholds to determine whether to establish a continuous channel with a terminal device. In some embodiments, an overall threshold for establishing a continuous channel are higher than a threshold for consistently routing communications in a given series of messages. In some embodiments, this difference between the overall threshold and threshold for determining whether to consistently route communication may be because a strong match is important in the continuous-channel context given the extended utility of the channel. In some other embodiments, an overall threshold for using a continuous channel is lower than a threshold for establishing a continuous channel and/or for consistently routing communications in a given series of messages.

Interaction management engine 525 can interact with an account engine 530 in various contexts. For example, account engine 530 may look up an identifier of a network device or terminal device in an account data store 535 to identify an account corresponding to the device. Further, account engine 530 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 525 can alert account engine 530 of various connection-channel actions, such that account data store 535 can be updated to reflect the current channel data. For example, upon establishing a channel, interaction management engine 525 can notify account engine 530 of the establishment and identify one or more of: a network device, a terminal device, an account and a client. Account engine 530 can (in some instances) subsequently notify a user of the channel's existence such that the user can be aware of the agent consistency being availed.

Interaction management engine 525 can further interact with a client mapping engine 540, which can map a communication to one or more clients (and/or associated brands). In some instances, a communication received from a network device itself includes an identifier corresponding to a client (e.g., an identifier of a client, webpage, or app page). The identifier can be included as part of a message (e.g., which client mapping engine 540 may detect) or included as other data in a message-inclusive communication. Client mapping engine 540 may then look up the identifier in a client data store 545 to retrieve additional data about the client and/or an identifier of the client.

In some instances, a message may not particularly correspond to any client. For example, a message may include a general query. Client mapping engine 540 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 545 can include identifications of one or more terminal devices (and/or agents) associated with the client. A terminal routing engine 550 can retrieve or collect data pertaining to each of one, more or all such terminal devices (and/or agents) so as to influence routing determinations. For example, terminal routing engine 550 may maintain a terminal data store, which can store information such as terminal devices' device types, operating system, communication-type capabilities, installed applications, accessories, geographic location and/or identifiers (e.g., IP addresses). Some information can be dynamically updated. For example, information indicating whether a terminal device is available may be dynamically updated based on (for example) a communication from a terminal device (e.g., identifying whether the device is asleep, being turned off/on, non-active/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message), client-identified or user-identified target response times, and/or system loads (e.g., generally or with respect to a user) may influence how many exchanges a terminal device may be involved in.

When interaction management engine 525 has identified a terminal device or client device to involve in a communication exchange or connection channel, it can notify terminal routing engine 550, which may retrieve any pertinent data about the terminal device from terminal data store 555, such as a destination (e.g., IP) address, device type, protocol, etc. Processing engine 510 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 560 can then transmit the communication to the terminal device or client device. The transmission may include, for example, a wired or wireless transmission to a device housed in a separate housing. The terminal device can include a terminal device in a same or different network (e.g., local-area network) as the connection management system. Accordingly, transmitting the communication to the terminal device can include transmitting the communication to an inter- or intra-network connection component.

Figure 6:
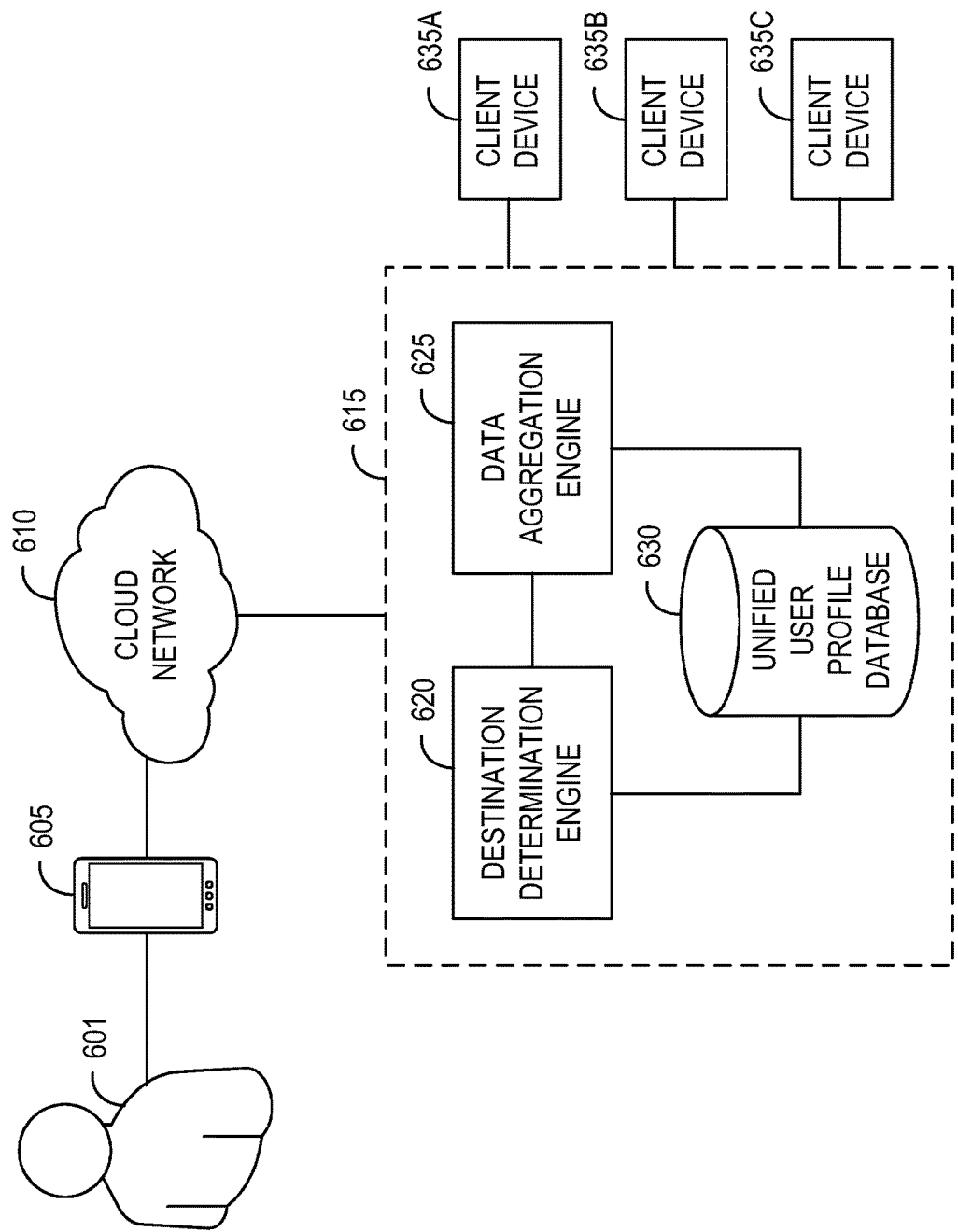
FIG. 6 shows a block diagram of a network environment for dynamic and automatic message processing during communication sessions.

FIG. 6 shows a block diagram of a network environment for dynamic and automatic message processing during communication sessions. As shown in FIG. 6, a user 601 may use a network device 605 to connect to a server 615 over cloud network 610. Network device 605 may be any suitable device, such as a mobile device, that is capable of transmitting and receiving communications in the form of text messages. In some embodiments, network device 605 may further be capable of making telephone calls. Cloud network 610 may be any suitable network configured to support text messaging, such as a cellular network.

Server 615 may be in the form of any suitable server that is also capable of sending and receiving text messages. Alternatively, server 615 may be in communication with another device capable of sending and receiving text messages. In some embodiments, server 615 may include or may be a connection management system. Server 615 may include a destination determination engine 620, a data aggregation engine 625, and a unified user profile database 630. In addition, server 615 may be in communication with a plurality of client devices 635A-C. Although shown and described as three client devices 635A-C, it is contemplated that server 615 may be in communication with any number of client devices.

The destination determination engine 620 may be configured to, in conjunction with a processor (not shown), receive text messages from network device 605 over cloud network 610. Destination determination engine 620 may determine the appropriate client device of the plurality of client devices 635A-C to which to route the text message. Destination determination engine 620 may, in some embodiments, determine that the server 615 is the appropriate destination for the text message, based on the content of the text message. In some embodiments, server 615 may be omitted, and text messages may be routed directly between the network device 605 and one or more of the client devices 635A-C. Destination determination engine 620 can further be configured to receive communications from the client devices 635A-C, reformat the communications as text messages, and route the text messages to the appropriate network device 605.

The data aggregation engine 625 may be configured to, in conjunction with a processor (not shown), request and/or retrieve data relative to user 601 or network device 605 from one or more of client devices 635A-C. Data aggregation engine 625 may, in response to a text message from network device 605, request data from client devices 635A, 635B, and 635C based on the content of the text message. For example, server 615 may receive a text message from network device 605 stating, "Send me all restaurants in McPherson Square that have a 7:00 PM reservation for 2 tonight." Data aggregation engine 625 may formulate a query to client devices 635A and 635C, which are associated with restaurants in McPherson Square, regarding whether they have reservations for 2 at 7:00 PM. When responses are received, they can be stored in association with the text message and an identifier of the user 601 and/or the network device 605 in the unified user profile database 630. In addition, the responses can be routed back to the network device 605.

Figure 7:
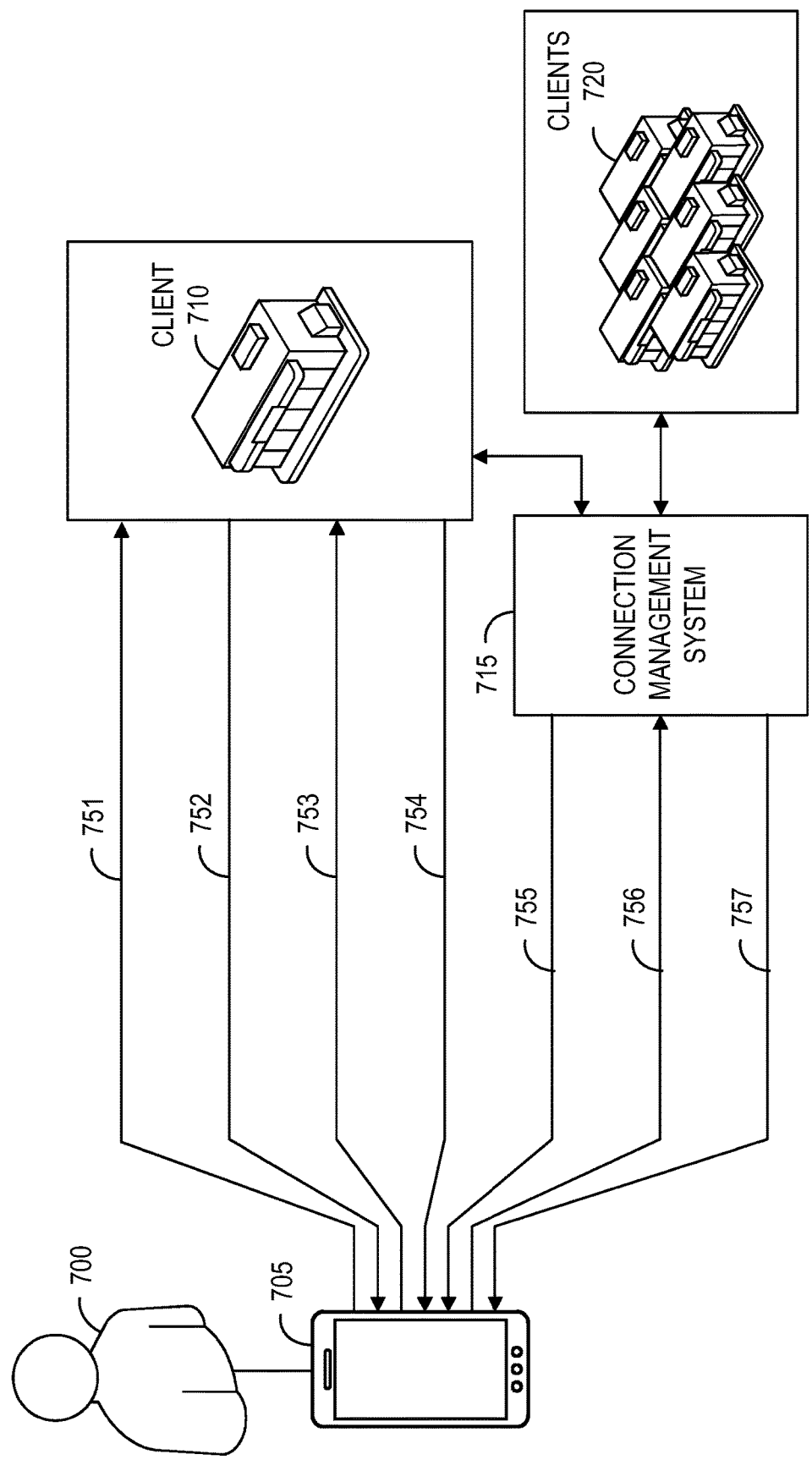
FIG. 7 shows a block diagram of a message environment that dynamically switches between a network device, a client device, and a connection management system.

FIG. 7 shows a block diagram of a message environment that dynamically switches between a network device, a client device, and a connection management system (e.g. a server or aggregation server). A user 700 may use a network device 705 to send text messages to client 710. The text messages may be sent to a landline telephone number associated with the client 710. In some embodiments, the text messages may be sent after user 700 uses the network device 705 to place a phone call to client 710 on the landline telephone number. Client 710 may be any goods or services provider.

For example, user 700 may use network device 705 to transmit a text message 751 to client 710 stating, "Can I make an appointment?" Although shown as network device 705 initiating the conversation, it is contemplated that client 710 may alternatively initiate the conversation. For example, user 700 can use network device 705 to call a landline telephone associated with client 710, and client 710 can respond with a text message to network device 705 instead of answering the call.

In response, client 710 can search its scheduling system to determine when available appointments are, and send a text message 752 (e.g. a message including a plurality of routing paths) stating, "Appointments are available Monday at 10 AM or 1 PM". Network device 705 can respond with a text message 753, e.g., "Monday at 10 AM". Client 710 can send a text message 754 stating that "Monday at 10 AM is confirmed." Client 710 can then update its scheduling system.

Meanwhile, client 710 can hand off the conversation to the server 615 of the connection management system or a similar server. Connection management system 715 may be in operative communication with a plurality of clients 720 and may be configured to retrieve, aggregate, and store data relating to user 700 or network device 705. For example, connection management system 715 may send a text message 755 to network device 705 asking, "See all appointments?" Network device 705 may respond with a text message 756, "Yes." Connection management system 715 may communicate with clients 720 to retrieve all of the user 700's appointments with all of the available clients 720. Connection management system 715 may transmit a text message 757 stating, "Here are all your appointments." The text message 757 may include all of the aggregated data from the clients 720.

Although shown and described with respect to connection management system 715 (e.g. a server or an aggregation server) initiating its conversation with user 700 via network device 705, it is contemplated that user 700 may alternatively initiate a conversation with the connection management system 715. In addition, although shown and described as a direct connection between network device 705 and client 710, it is contemplated that connection management system 715 may similarly interface between the network device 705 and the client 710.

The connection management system 715 can, in some embodiments, process a message from a client device for an intent indicator data or intent data. This can include natural language processing to select an intent value associated with a message from a client device to the content management system 715. For example, if client device were to text "appointments" to content management system 715 after message 753 and before receiving message 755, this word could be processed by content management system 715 as an intent indicator data using a machine learning model at connection management system 715. The content management system, using the intent indicator data with the messaging history from client 710 could process the text "appointments" to select an intent value from a plurality of possible intent values. Such intent values can includes an option to see all appointments, cancel appointments, reschedule appointments, or other such values. Using the machine learning model, the text "appointments" can be processed to select a response associated with an intent value. In this case, the machine learning model of connection management system 715 determines that receiving a response message associated with an intent value of seeing all appointments corresponds most closely with the intent indicator data "appointments", and response with message 755 "See all appointments?" By contrast, a new message from network device 705 to connection management system 715 "new appointment", "cx apptmt", "apt?", "nxt apt", "apt time?", or "cng apt time?" could each result in connection management system 715 providing a different response based on a different intent value determined from the intent indicator data identified from the message.

In some such examples, a connection management system can access or store information from previous communications with a client device or account associated with a client device. This can include information on routing paths provided to a client device and routing path selections received at a client from a network device. This information can be received at connection management system 715 from client 710, clients 720, or directly from network device 705. The connection management system 715 then receives a new message from the network device 705, with the new message including intent indicator data. The intent indicator data can be natural language text or voice information. The intent indicator data can also be metadata received as part of the new message. In some embodiments, the intent indicator data or multiple elements of intent indicator data can include combinations of such data. The connection management system 715 then processes the intent indicator data(s) using one or more machine learning models, and generates a response using the machine learning models. As described above, this can be a response including one or more routing paths based on the intent indicator data and any other data available to connection management system to infer an intent of a user of network device 705. A response is then generated by connection management system 715 or a client 720 managed by connection management system 715 based on the intent indicator data and previous data (e.g. a prior selection of a routing path from communications between network device 705 and client 710). The response is communicated to network device 705 using connection management system 715, including information and data to facilitate display of response data on network device 705.

A connection management system can include an intent processing system that uses intent indicator data to update an intent associated with a user account. The intent data, as described herein, can be collected via a communications session, history data, user profile data, or any such source. One example can include natural language text from a customer indicating an attempt to move money between a main account and a new flex account that has opened and that is associated with the customer. The intent processing system can evaluate this intent indicator data to determine the issue that the customer wishes to have addressed. In this particular instance, the customer may be having trouble transferring funds from one online account to another account. Based on the provided intent indicator data, the intent processing system may gather the intent indicator data with other context data to update intent values or other action values used to determine which client nodes and associated actions or information to take in response to the intent indicator data. This can include intent or action values associated with a context that the request or issue is shared in, a level of urgency, a stress or anxiety level of the customer, whether there is a time pressure, and the like. Further, the intent processing system may identify, based on the intent value selected, what the customer wishes to have resolved.

In one example, based on an identified intent value, an intent processing system of a connection management system identifies a selected process to in order to resolve the issue or request provided by the customer that is associated with the identified intent value. For example, based on the intent indicator data from a customer, the intent processing system may determine that accounts have to be authorized before customers can transfer funds into them. Further, the intent processing system may determine that authorizing an account can be performed online. Based on the identified process, the intent processing system may develop a strategy for responding to the customer intent in a manner that would not only resolve the intent but do so in a manner that leads to a positive customer experience. This can include directing the customer to a client customer service node, or assisting with establishing a connection channel with such a node. The intent system can include machine learning processes that may include developing a foundation for the response, a desired result of the response, and/or any positive additions to give flavor to the response. The contents of the proposed response may be generated based on customer preferences as identified in the customer profile via analysis of past customer interactions with agents as part of a machine learning system. The intent processing system may use the proposed response strategy for routing paths to be provided to a customer for additional selections and approval of the proposed response strategy. This can be part of an existing communication channel, or the intent processing system can establish a new channel for the purpose of communicating with the user and receiving approval of the strategy from the user. If the strategy is approved, the connection management system can assist with a new channel to the appropriate client node. If the strategy is rejected, a new strategy or a default fallback strategy, such as routing user communications to a help desk or help routing path, can be performed. In some systems, any such response can be customized or set based on machine learning algorithms that account for the particular intent indicator data and context data (e.g. user stress, user intent indicators, user history data, etc.) to provide routing data selected by the machine learning algorithm. In addition to customized routing paths, a system can generate customized natural language communications associated with the customized routing paths based on the data (e.g. intent indicator data, action data, user demographic data, etc.) This can include customized language and terminology for a user (e.g. "I see the issue") to provide information customized to the user. Such systems improve the operation of the devices and communication systems by reducing the system resources used by individual users to reach an appropriate resolution, and to improve communication efficiency.

The machine learning model can use a feedback system that monitors communications between a network device (e.g. customer) and a service (e.g. client). Such a performance monitoring system can monitor the interactions between the customer and client to determine whether the client is being effective in addressing the intent of a customer. For instance, the performance monitoring system may evaluate any customer utterances to determine whether the intent is being fulfilled as new intent indicator data is received from a customer (e.g. monitoring frustration levels or machine learning identified indicators that a customer is not achieving expected results from interactions with current nodes of a client system). As an illustrative example, the performance monitoring system may determine that when the customer responds with "Done," the customer has acknowledged positive results from a client provided routing path, and that the customer was able to select a routing path to achieve the customer's intent. Further, when the customer responds with "Thanks! That worked!" the performance monitoring system may determine that the customer's intent has been met. This information can then be used to update machine learning models for any aspect of the system, including analysis of other user's intent indicator data to identify intent values for future system users. For instance, the performance monitoring system may implement an investigative algorithm that monitors client metrics to determine why certain routing paths are selected with negative or positive customer results. Based on this determination, the performance monitoring system can provide feedback to a machine learning algorithm to update operations, node selections, and routing paths to improve system performance. As described herein, a server system (e.g. server 615) can perform any such operations, or the operations can be part of a networked server system with different subsystems or engines operating together to perform such operations. This can include the configuration described above where server 615 may include or may be a connection management system, a destination determination engine 620, a data aggregation engine 625, a unified user profile database 630, or any combination of such elements. In other embodiments, other configurations or implementations can be used.

Figure 8:
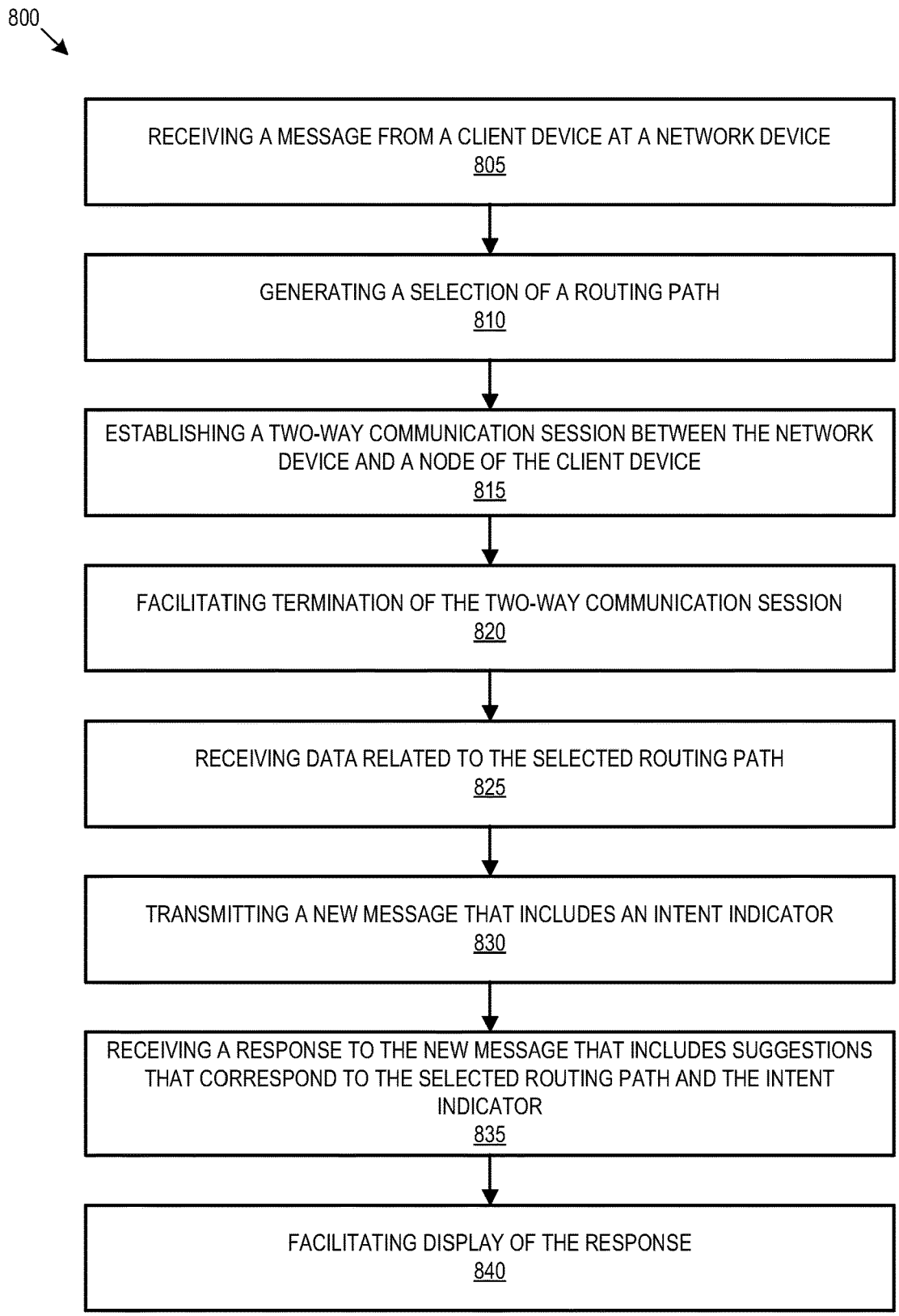
FIG. 8 is a flowchart illustrating a method of dynamic messaging processing.

FIG. 8 is a flowchart illustrating a method of dynamic messaging processing. At step 805, a message is received from a client device at a network device. The message may be a text message. The message may include a plurality of routing paths. For example, the message may include a plurality of options of service requests that may be fulfilled by the client device if requested by the network device. The message may have been generated by the client device in response to a landline telephone call made by the network device to the client device. In some embodiments, the network device may generate an initial message to the client device via the landline telephone number. The routing path within the message include the various selection options that can be used or responded to by the network device to allow a user of the network device to indicate a selection of a particular routing path of the plurality of routing paths. One routing path can involve a request for general assistance in navigating the plurality of routing paths. Another routing path can involve selection of a specific category of service requests available from the plurality of routing paths. The plurality of routing paths can include shared branches within a complex set of paths, such with nested sub-paths in a routing tree. Additionally, particular paths in the plurality of routing paths can be associated with servers. These servers can be separate from the client devices, and based on the particular information or results expected from a routing path that are associated with services or information available from a server. Additional aspects of such server are used in steps 830 and 835 below, which can involve messaging to and from such a server.

At step 810, a selection of a routing path of the plurality of routing paths is generated. For example, a user may use the network device to select (e.g. using input interfaces of the network device) an option correlating to a service request that may be fulfilled by the client device. As described above, such a message can be received following termination of a previous communication channel (e.g. a telephone or voice channel). In some embodiments, a client machine learning model processes information from the previous channel and uses this information to select the plurality of routing paths that are provided to a network device. This can be based, as described above, on any information collected as part of the previous communication as well as any other information about a user or account associated with a network device. The client device may present the plurality of routing paths as a variety of options to the network device of service requests that may be completed by text message. In other embodiments, any such channel or combination of channels including text messaging or other messaging can be used for presentation of the options.

At step 815, a two-way communication session is established between the network device and a node of the client device. This session can be established in response to selection of the routing path at the network device. A client device can have multiple nodes, with certain nodes associated with certain routing paths, so that the node for the two-way communication can be determined based on the selected routing path. For example, if the selected routing path corresponds to a service request for appointments, the associated node of the client device can be a scheduling engine. If the selected routing path is for information, the node can be an assessment and response engine. The communications between the network device and the client device may include conversations or communications regarding fulfillment of the service request. In any case, the network device participates in establishing the two-way communication as a participant in channel communications between the network device and the node.

In some examples, the communications as part of the two-way communication session can be processed and analyzed by one or more engines in a system. In one embodiment, for example natural language processing can be performed on a channel of communications to generate natural language understanding or natural language interpretation data. Such data can be generated by parsing and analyzing not only the data from the communication channel, but other context data as well. This can include metadata from the channel, location or context data derived from the selected routing path and the context of the plurality of routing paths. Other context data such as date, time, user or device identifications or associations, and any other such data can be used as part of natural language understanding or natural language interpretation data. Such data can then be used to generate a value for an intent indicator data from a limited selection of intent indicator data within a system. For example, the plurality of routing paths can be structured in the context of a system to provide data or take actions on behalf of a user, with a limited number of intents associated with the data and actions available within the system. By processing data from the communication channel, channel metadata, context data, previous routing path selection data for a particular user or network device, or any combination of such data, a value associated with an expected user intent can be generated as an intent indicator data.

At step 820, termination of the two-way communication session is facilitated. For example, the client device may fulfill the service request, and no further service requests are made by the network device. The network device can the channel as part of facilitating termination of the two-way communication session. Termination of the communication session may cause the client device to transmit the selected routing path. The selected routing path may be transmitted to a connection management system or server, for example.

At step 825, data related to the selected routing path is received. For example, if the selected routing path relates to a reservation at one restaurant, information about the restaurant, about other reservations or appointments made, and the like may be received at the network device.

At step 830, a new message may be transmitted. The new message may be a text message. The new message may be transmitted to the connection management system from the network device, for example. The new message may include an intent indicator data. In various embodiments, the intent indicator data is indicative of a desired action in a variety of ways. In some embodiments, the new message may be in natural language, (e.g., conversational.) Natural language processing at the network device can be used to generate a value for the intent indicator data to be sent with the message. When the new message is received at the server, the server may generate a response by using a machine-learning model to evaluate the selected routing path and the intent indicator data. As described above, such machine-learning can use natural language analysis in conjunction with the intent indicator data, and other context data, to generate a response to the new message from the network device. Continuing the above example, the intent indicator data could be to make another reservation, and additional information about the reservation can be inferred from the machine-learning model using the value of the intent indicator data along with other data in the new message (e.g. natural language or conversational data that accompanies the intent indicator data). Information about the plurality of routing paths and the selection of a specific routing path in the two-way communication session or any previous communication session with the user device can be used to inform the machine-learning model at the client device.

At step 835, the response to the new message is received. In one embodiment, the response is a text message. In other embodiments, other communication channels, including any combination of communication channels described herein, can be used. The response may include one or more suggestions that correspond to the selected routing path and the intent indicator data. In some embodiments, the one or more suggestions includes aggregated data related to the selected routing path for a plurality of client devices, and the aggregated data may be specific to the network device. In the above example, the response may include a variety of restaurants and a list of times available for an additional reservation. At step 840, display of the response is facilitated. For example, the text message response may be displayed on the network device.

The above description is given in a context of a restaurant reservation system. It will be apparent that aspects of such methods can apply to a wide variety of other systems. One client device, for example, can provide customer assistance for a product. The plurality of routing paths can include routing paths for device operation assistance for a functional device, device analysis and repair assistance for a non-functioning device, and ordering assistance for products related to the device. Each sub-set of such routing paths can have a different node at a client device. When a network device selects a particular routing path from among the provided routing paths, a channel is established with a node of the client device. As described above, data that is exchanged on the channel between the network device and the node of the client device as well as other data (e.g. context, metadata for the channel, etc.) can be analyzed to assist with both intent indicator data value selection at a network device and machine-analysis at the client device or server. The client device or a server can then provide additional information to the network device after a two-way communication session is terminated, and the network device can display the response. This can include details on ordering replacement parts, directions for selecting operating modes of a device, links or communication channel information for interacting with third parties about ordering related items or where to find additional information.

Figure 9:
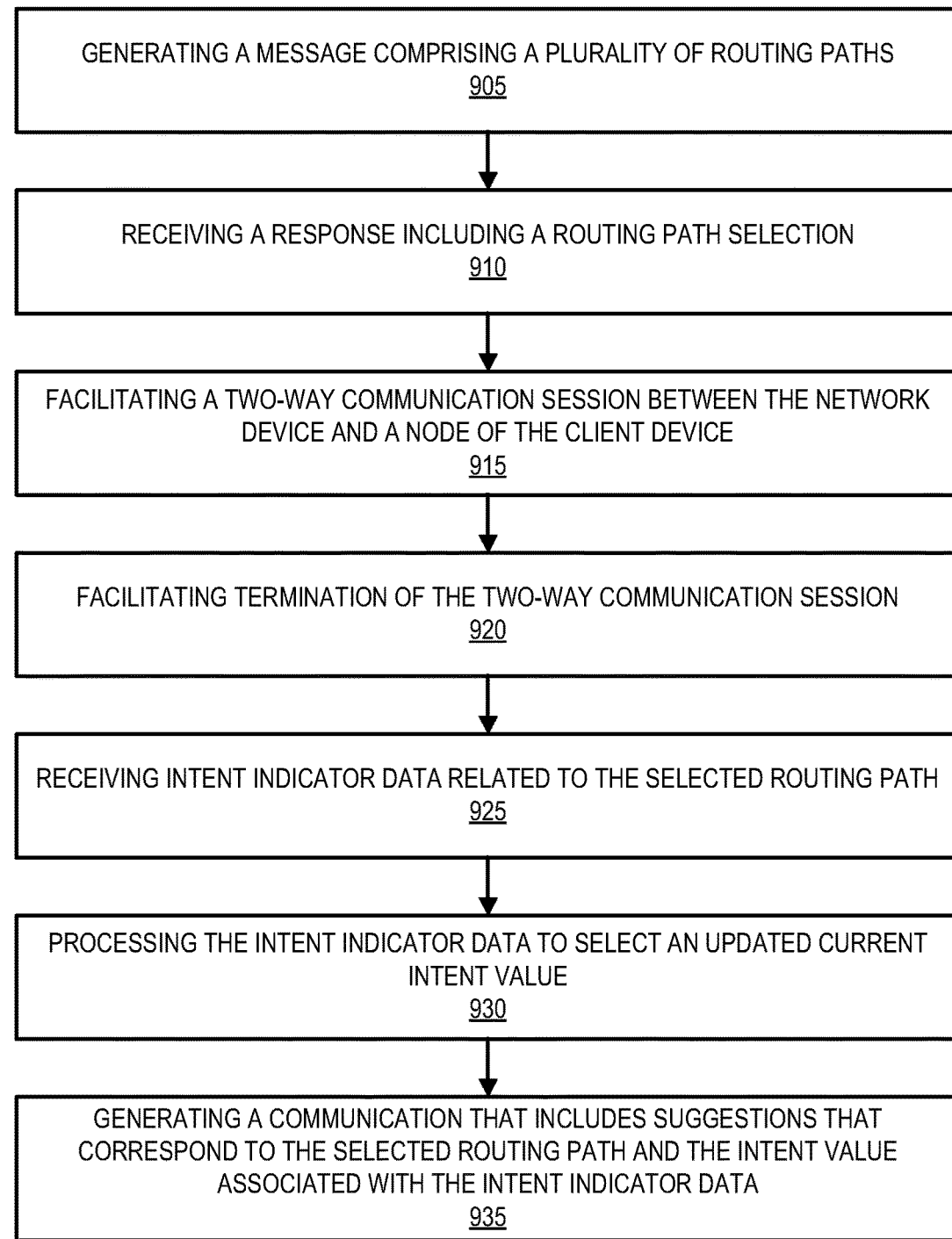
FIG. 9 is a flowchart illustrating a method of dynamic messaging processing and data aggregation in accordance with embodiments described herein.

FIG. 9 is a flowchart illustrating a method of dynamic messaging processing and data aggregation. In some implementations, process 900 of FIG. 9 corresponds to server operations interacting with a network device performing corresponding operations of process 800. In other embodiments, process 900 can interact with a network device and client devices performing other similar corresponding operations for message processing and data aggregation. Process 900 can be performed by a server system, such as server 615, or any other such system. In some embodiments, process 900 can be embodied as instructions stored in a non-transitory medium that, when executed by one or more processors of a system, cause the system to perform process 900.

Step 905 of process 900 involves generation of a message comprising a plurality of routing paths. As described herein, such routing paths involve runtime decisions of a system as to where to deliver a given message or event based on a certain context. The plurality of routing decisions can involve options based on expected user preferences, overviews, or expected intent(s) associated with a user to allow a user selection of a routing path of the plurality of routing paths selected by a user. The plurality of routing paths can be based on queries to various client systems or nodes of a client system that can be associated with the expected intents for a user, or with routing paths structured to efficiently allow a user to provide intent indicator data from a user's network device to the server that matches a user's intent. Such queries to nodes or client systems can gather context or other supporting data that the server can use (e.g. with machine learning algorithms) to select intent values for a user based on the context data and expected intent indicator data to be received in subsequent steps.

In step 910 of process 900, a response is received that includes a routing path selection. The server uses this routing path selection in step 915 to facilitate a two-way communication session between the network device (e.g. a user's device such as a smartphone) and a node of the client device (e.g. a system associated with the routing path selected from the plurality of routing paths). The server can facilitate both the communications and the eventual termination of the two-way communication session in step 920 as part of connection management system (e.g. connection management system 715) operations of a server. As described herein, such operations can be integrated with client devices and client nodes (e.g. clients 710 and 720), or can be structured independently in other embodiments.

In step 925 of process 900, intent indicator data related to the selected routing path is received at a server system. This can be part of a message being routed via a connection management system from a network device to a client node, or can be data about a user or user account from any source associated with a current user's attempt to achieve an intent within the system. In various embodiments, intent indicator data can be gathered as part of dynamic message processing and data aggregation not only in step 925, but throughout any communications or interactions using the server or associated devices that share aggregated data with the server. This can include the response from step 910, data exchanged as part of the two-way communication session as part of step 920, or any other previous steps that include data that can be aggregated for use in assisting a user's interactions with the server (e.g. to identify an intent value from intent indicator data and to provide responses to service the intent). In step 930, this data can be processed to select an updated intent value in the system. In some embodiments, the intent value is a derived value from a variety of context information including intent indicator data directly from a user's network device, as well as from any other source described herein. As data is aggregated and analyzed for current interactions with a network device, a server performing process 900 can update an intent value for the network device using machine learning models. The intent value is thus a mutable indicator that changes as new information is derived (e.g. from current communications with a user's network device) over time.

In some embodiments, a system can have an initial intent value based on expectations of a likely reason for a user to interact with a system. As actual interactions occur, they can confirm the prior intent, or can cause the intent value to be modified. The machine learning model can they update the intent value in the system over time without any interactions with a user, and that stored intent value based on aggregated data can be used to inform the initial interactions with a user's network device the next time a user is involved in a communication channel associated with the system (e.g. managed by a connection management system associated with the server). The data aggregated by the system can not only be data routed by the system, but can also include data input to the system by agents of the client, such as live operators that can be tasked with interacting with a user at certain points. Information about those interactions, including data automatically processed from the system and data input by the agents, can all be fed into a machine learning model. The data is stored in a fixed fashion, and is used to update the changing intent value associated with a user or user account.

Further, in addition to a server receiving intent indicator data, that data can be processed in a variety of ways for use in determining an intent value. In some embodiments, natural language processing can be performed using tools such as Lex and Dialogflow for text or automatic speech recognition. Natural language understanding (NLU) or inference systems from such tools can then be used to structure the information in the intent indicator data. In some implementations, such data can then be processed by machine learning or artificial intelligence tools (e.g. neural networks) to select an intent value from a limited set of possible intent values associated with a system. Such intent values for a system can be associated with particular client nodes and routings. In some systems, the intent values for particular nodes can be subsets of the intent values for a system, with multiple tiers or levels of decisions made using machine learning analysis at each level to determine a current intent value and update the intent value as additional information is received from a user's network device. Additional details of intent value determination are described in U.S. patent application Ser. No. 16/601,863 titled "DYNAMIC ENDPOINT COMMUNICATION CHANNELS" which is incorporated by reference for all purposes.

In step 935 of process 900, a communication is generated that includes suggestions corresponding to the intent value associated with the intent indicator data and the routing path from step 910. In the context of step 930 described above and the analysis performed by a server system, once the intent value (e.g. an updated intent value based on current network device communications) is identified for a particular step, a communication including suggestions (e.g. new routing paths) is generated for a user's network device. This communication can then facilitate display of options and information on a network device that either meets a user's intent, or can be used to further communicate with the system to attempt to achieve the user's intent associated with current system interactions.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method, comprising:
   storing history data for a two-way communication sessions, wherein the history data includes contact information for a plurality of communication types, a message history including a selected routing path, an intent value associated with the message history, and a first communication type of the plurality of communication types associated with the message history;
   receiving intent indicator data related to the selected routing path and the intent value;
   processing the intent indicator data and the history data identify an updated intent value,
   dynamically generating customized routing paths using the updated intent value and the history data;
   generating a new message including the customized routing paths that correspond to the selected routing path and the updated intent value; and
   transmitting the new message using a second communication type different than the first communication type.

2. The computer-implemented method of claim 1, wherein the second communication type is a text message type, and wherein the new message includes a plurality of options for service requests that can be completed via text message.

3. The computer-implemented method of claim 1, further comprising:
receiving a new response including a new selected routing path selected from the customized routing paths; and
updating the intent value using the new selected routing path.

4. The computer-implemented method of claim 1, further comprising:
selecting a node associated with a cluster of terminal device based on the intent value, wherein the selected routing path is associated with the node; and
selecting a new node using the updated intent value, wherein the customized routing paths are associated with the new node.

5. The computer-implemented method of claim 1, wherein the history data is further associated with a node that includes a cluster of client devices and a shared database of a client system.

6. The computer-implemented method of claim 1, further comprising:
receiving a response to the new message; and
updating a machine learning model used to generate the new message based on the response.

7. The computer-implemented method of claim 1, wherein the customized routing paths are generated by a machine learning algorithm to include customized language and terminology and wherein the customized language and terminology are customized for the updated intent value by the machine learning algorithm using the intent indicator data.

8. A device comprising:
a memory; and
one or more processors coupled to the memory and configured to perform operations including:
storing history data for a two-way communication sessions, wherein the history data includes contact information for a plurality of communication types, a message history including a selected routing path, an intent value associated with the message history, and a first communication type of the plurality of communication types associated with the message history;
receiving intent indicator data related to the selected routing path and the intent value;
processing the intent indicator data and the history data identify an updated intent value;
dynamically generating customized routing paths using the updated intent value and the history data;
generating a new message including the customized routing paths that correspond to the selected routing path and the updated intent value; and
transmitting the new message using a second communication type different than the first communication type.

9. The device of claim 8, wherein the second communication type is a text message type, and wherein the new message includes a plurality of options for service requests that can be completed via text message.

10. The device of claim 8, wherein the one or more processors are configured for operations further comprising:
receiving a new response including a new selected routing path selected from the customized routing paths; and
updating the intent value using the new selected routing path.

11. The device of claim 8, wherein the one or more processors are configured for operations further comprising:

selecting a node associated with a cluster of terminal device based on the intent value, wherein the selected routing path is associated with the node; and
selecting a new node using the updated intent value, wherein the customized routing paths are associated with the new node.

12. The device of claim 8, wherein the history data is further associated with a node that includes a cluster of client devices and a shared database of a client system.

13. The device of claim 8, wherein the one or more processors are configured for operations further comprising:
receiving a response to the new message; and
updating a machine learning model used to generate the new message based on the response.

14. The device of claim 8, wherein the customized routing paths are generated by a machine learning algorithm to include customized language and terminology and wherein the customized language and terminology are customized for the updated intent value by the machine learning algorithm using the intent indicator data.

15. A non-transitory computer-readable storage medium comprising instructions that, when executed by one or more processors of a device, cause the device to perform operations comprising:
storing history data for a two-way communication sessions, wherein the history data includes contact information for a plurality of communication types, a message history including a selected routing path, an intent value associated with the message history, and a first communication type of the plurality of communication types associated with the message history;
receiving intent indicator data related to the selected routing path and the intent value;
processing the intent indicator data and the history data identify an updated intent value;
dynamically generating customized routing paths using the updated intent value and the history data;
generating a new message including the customized routing paths that correspond to the selected routing path and the updated intent value, and
transmitting the new message using a second communication type different than the first communication type.

16. The non-transitory computer-readable storage medium of claim 15, wherein the second communication type is a text message type, and wherein the new message includes a plurality of options for service requests that can be completed via text message.

17. The non-transitory computer-readable storage medium of claim 15, wherein the instructions configure the device for operations further comprising:
receiving a new response including a new selected routing path selected from the customized routing paths; and
updating the intent value using the new selected routing path.

18. The non-transitory computer-readable storage medium of claim 15, wherein the instructions configure the device for operations further comprising:
selecting a node associated with a cluster of terminal device based on the intent value, wherein the selected routing path is associated with the node; and
selecting a new node using the updated intent value, wherein the customized routing paths are associated with the new node.

19. The non-transitory computer-readable storage medium of claim 15, wherein the instructions configure the device for operations further comprising associated with a node that includes a cluster of client devices and a shared database of a client system.

20. The non-transitory computer-readable storage medium of claim 15, wherein the instructions configure the device for operations further comprising:
  receiving a response to the new message; and
  updating a machine learning model used to generate the new message based on the response.

21. The non-transitory computer-readable storage medium of claim 15, wherein the customized routing paths are generated by a machine learning algorithm to include customized language and terminology and wherein the customized language and terminology are customized for the updated intent value by the machine learning algorithm using the intent indicator data.

* * * * *